UNITED STATES PATENT OFFICE.

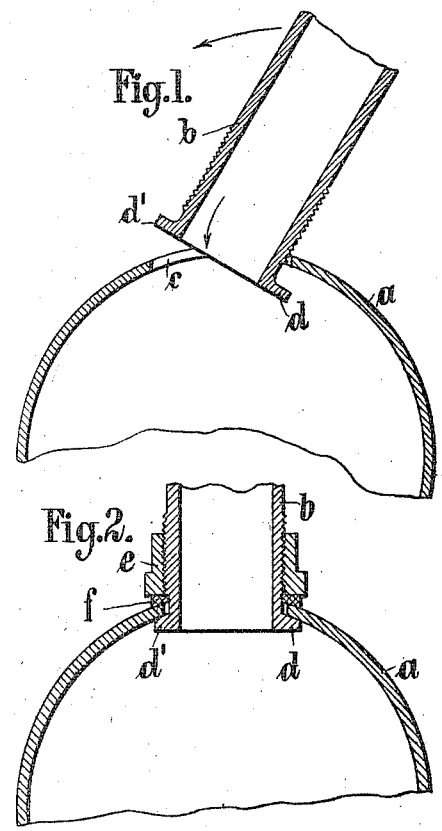
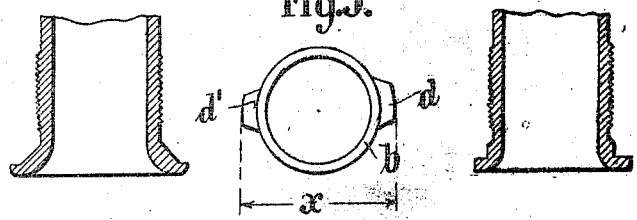

CARL WESTPHAL, OF LEIPZIG, GERMANY.

PIPE-JOINT.

1,049,283.   Specification of Letters Patent.   Patented Dec. 31, 1912.

Application filed November 15, 1912. Serial No. 731,571.

*To all whom it may concern:*

Be it known that I, CARL WESTPHAL, a subject of the King of Prussia, residing at 16 Kaiser Wilhelm strasse, Leipzig, Germany, have invented a certain new and useful Improved Pipe-Joint; and I do hereby declare the following to be a full, clear, and exact description of the invention.

My invention relates to an improved pipe-joint for branch pipes. In known joints of this kind the branch-pipe has been provided with lugs, and the main pipe has had, at the edge of the opening receiving the branch pipe, slots or recesses corresponding with said lugs. After the lugs enter the slots, the branch pipe is rotated so that the said lugs pass under the edge of the said opening in the main pipe. This joint is in fact a modified bayonet joint. For practical work such a method is not feasible.

In the case of steel or cast-iron pipes with which it is desired to effect a connection after the main pipe has been laid in its trench the slots or recesses at the edge of the opening have usually to be cut in after boring, and this must be done after the boring tackle has been dismantled. It is not in practice possible to permit such a complicated operation in the case of pipes already laid for gas, water or steam. Even when the pipe is not already laid the operation is costly, occupies considerable time and nearly always leads to some injury being done to the pipe. Moreover after the branch pipe has been inserted there is nothing to stop it being rotated too far, and the lugs can therefore very easily be again brought opposite the recesses, so that their engagement with the edges of the aperture in the main pipe is lost. It has also been proposed to fasten the ends of tubes into tube-walls by using an anchor-plate which is introduced by being inclined somewhat, but such an arrangement would not generally be applicable to branch pipe connections because not only would several somewhat elongated holes need to be made in the main pipe thereby considerably weakening it, but, owing to the presence of the anchor-plate, the section both of the main and branch pipe would be reduced.

A primary object of my invention is to obviate the above defects, and to this end I arrange firstly, that the main pipe has nothing but a round hole, which can of course be formed by any suitable boring appliance, secondly, that the branch pipe has such lugs that they can be passed to the rear of the wall of the main pipe, and can thus engage behind the opening in this pipe, and thirdly, that the branch pipe carries a sleeve-like clamping nut to secure the joint. No further work therefore need be done on the main pipe beyond the boring operation. The pipe cross-sections are not reduced.

The branch pipe having two or more lugs is introduced into the suitably bored hole in the main pipe by being somewhat inclined thereto, and when again set in its correct position is secured firmly to the main pipe by means of a sleeve-like nut. The lugs engaging below the edge of the opening in the main pipe will then prevent the branch pipe from again coming out.

Some illustrative embodiments of my invention are diagrammatically represented by way of example in the accompanying drawing, wherein:—

Figure 1 is a sectional view of the pipes showing the position of the branch pipe when about to be introduced into the main pipe, Fig. 2 a sectional view when the same pipes are correctly placed, Fig. 3 a plan view of the branch pipe, Fig. 4 a longitudinal section of a branch pipe having lugs of a slightly modified form, and Fig. 5 a similar section of a branch pipe having lugs shouldered down to centralize the branch pipe in the main pipe.

The main pipe $a$ has bored therein a round hole $c$ the diameter of which is considerably less than the overall diameter of the branch pipe head at the lugs $d$, $d^1$ (Fig. 3). Into this aperture $c$ the head of the branch pipe is introduced by tilting the latter so that, as shown in Fig. 1, first, one lug $d$ is engaged beneath the edge of the hole $c$ and the pipe $b$ then swung in the direction of the arrow until it is in substantial alinement with the axis of the hole and the other lug $d$ has entered the latter. Upon the adjustment of the pipe $b$, centrally of the hole $c$, the lugs engage the inner face of the main pipe at opposite sides of the hole, (Fig. 2). The sleeve-like nut $e$ threaded on the branch pipe adjacent its head is then screwed down against the outer surface of the main pipe to make the joint mechanically secure. Any suitable joint closure, such as a packing ring $f$, is arranged between the nut and the main pipe to render the joint gas or liquid tight, as may be.

To facilitate the centering of the branch pipe in the hole $c$ and to insure its remaining in centered position, the retaining lugs are preferably suitably formed on their engaging faces, for this purpose. Thus in Fig. 4 they are shown as having their engaging faces inclined, while in Fig. 5 they are stepped or shouldered down.

I claim:—

1. A branch pipe joint comprising a main pipe with circular aperture bored in the wall thereof, a branch pipe having a head with lugs rigidly outstanding in fixed position on the opposite sides thereof, the overall diameter of said branch pipe head at the lugs exceeding the diameter of the circular aperture in the main pipe, but being such as to permit the introduction of said branch pipe head through said aperture by inserting one lug through the aperture while the branch pipe is in angular position and then swinging the latter into substantial alinement with the axis of the hole so as to pass the other lug through the latter, a nut threaded on said branch pipe and means engaged between said nut and main pipe to seal the joint when the nut is tightened.

2. A branch pipe joint comprising a main pipe with circular aperture bored in the wall thereof, a branch pipe having a head with lugs rigidly outstanding in fixed position on the opposite sides thereof, the overall diameter of said branch pipe head at the lugs exceeding the diameter of the circular aperture in the main pipe, but being such as to permit the introduction of said branch pipe head through said aperture by inserting one lug through the aperture while the branch pipe is in angular position and then swinging the latter into substantial alinement with the axis of the hole so as to pass the other lug through the latter, a nut threaded on said branch pipe and means engaged between said nut and main pipe to seal the joint when the nut is tightened, together with means for centering said branch pipe head in the aperture in the main pipe.

3. A branch pipe joint comprising a main pipe with circular aperture bored in the wall thereof, a branch pipe having a head with lugs rigidly outstanding in fixed position on the opposite sides thereof, the overall diameter of said branch pipe head at the lugs exceeding the diameter of the circular aperture in the main pipe, but being such as to permit the introduction of said branch pipe head through said aperture by inserting one lug through the aperture while the branch pipe is in angular position and then swinging the latter into substantial alinement with the axis of the hole so as to pass the other lug through the latter, a nut threaded on said branch pipe and means engaged between said nut and main pipe to seal the joint when the nut is tightened, said lugs being shaped on the faces thereof which engage the edges of the aperture in the main pipe to center said branch pipe with relation to said aperture.

In testimony whereof I have signed my name to this specification, in the presence of two subscribing witnesses.

CARL WESTPHAL.

Witnesses:
RUDOLPH FRICKE,
DORIS KNAHL.